US009357472B2

(12) United States Patent
Mukherjee

(10) Patent No.: US 9,357,472 B2
(45) Date of Patent: May 31, 2016

(54) ADAPTIVE WIRELESS SENSOR NETWORK AND METHOD OF ROUTING DATA IN A WIRELESS SENSOR NETWORK

(71) Applicant: International Business Machines Corporation, Armonk, NY (US)

(72) Inventor: Amitava Mukherjee, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/927,348

(22) Filed: Jun. 26, 2013

(65) Prior Publication Data

US 2015/0003309 A1    Jan. 1, 2015

Related U.S. Application Data

(63) Continuation of application No. 12/767,850, filed on Apr. 27, 2010, now Pat. No. 8,514,760.

(51) Int. Cl.
*H04L 12/28* (2006.01)
*G01R 31/08* (2006.01)
(Continued)

(52) U.S. Cl.
CPC ............ *H04W 40/10* (2013.01); *H04L 45/121* (2013.01); *H04L 45/24* (2013.01)

(58) Field of Classification Search
CPC ......... G08C 17/00; G01R 31/08; H04W 4/00; H04W 40/02; H04B 7/00; H04Q 7/24
USPC ......... 370/310, 311, 312, 318, 328, 329, 351, 370/350, 503, 517–519, 338, 216, 241, 242, 370/389, 390, 230–236
See application file for complete search history.

(56) References Cited

U.S. PATENT DOCUMENTS 6,735,630 B1    5/2004   Gelvin et al.
7,277,414 B2 *  10/2007  Younis et al. .................. 370/338
(Continued)

FOREIGN PATENT DOCUMENTS

CN       101237414      8/2008
CN       101272327      9/2008
(Continued)

OTHER PUBLICATIONS

He et al.; "Energy-Efficient Surveillance System Using Wireless Sensor Networks"; Proceedings of ACM MobiSYS 2004. 19 pages.
(Continued)

*Primary Examiner* — Hanh N Nguyen
(74) *Attorney, Agent, or Firm* — Schmeiser, Olsen & Watts; John Pivnichny

(57) ABSTRACT

A method of routing data in a wireless sensor network, a program product and a wireless sensor network. The method, includes: (a) detecting a temporal event by a source sensor node of a wireless sensor network comprising a multiplicity of sensor nodes; (b) identifying multiple paths from the source sensor node to a sink of the wireless sensor network, the multiple paths consisting of sensor node to sensor node hops; and after (b), (c) using a processor of the source sensor node, optimizing a distribution of data packets to each path of the multiple paths by simultaneously reducing (i) power consumed by sensor nodes in each path of the multiple paths and (ii) a time to transmit the data packets from the source sensor node to the sink.

26 Claims, 7 Drawing Sheets

(51) Int. Cl.
*H04W 40/10* (2009.01)
*H04L 12/727* (2013.01)
*H04L 12/707* (2013.01)

(56) References Cited

U.S. PATENT DOCUMENTS

| | | | |
|---|---|---|---|
| 7,436,789 B2* | 10/2008 | Caliskan et al. | 370/310.1 |
| 7,881,206 B2 | 2/2011 | St. Pierre et al. | |
| 8,085,792 B1 | 12/2011 | Aly | |
| 8,514,760 B2* | 8/2013 | Mukherjee | H04L 45/00 370/216 |
| 2006/0178156 A1 | 8/2006 | Kim | |
| 2008/0253327 A1 | 10/2008 | Kohvakka et al. | |
| 2009/0109885 A1 | 4/2009 | Fonseca et al. | |
| 2009/0201899 A1 | 8/2009 | Liu et al. | |
| 2009/0296704 A1 | 12/2009 | Kim et al. | |
| 2010/0278069 A1 | 11/2010 | Sharma et al. | |
| 2010/0309841 A1* | 12/2010 | Conte | 370/328 |
| 2011/0261738 A1 | 10/2011 | Mukherjee | |

FOREIGN PATENT DOCUMENTS

| | | |
|---|---|---|
| CN | 101286934 | 10/2008 |
| WO | 03015452 | 2/2003 |

OTHER PUBLICATIONS

Heinzelman et al.; "Energy-Efficient Communication Protocol for Wireless Microsensor Networks"; IEEE Proceedings of the 33rd Hawaii International Conference on System Sciences, Jan. 2000. pp. 1-10.

De et al.; "Meshed multipath routing with selective forwarding: an efficient strategy in wireless sensor networks"; Computer Networks 43 (2003). pp. 481-497. [online]. < URL: http://www.sciencedirect.com/science?_ob=ArticleURL&_udi=B6VRG-4991M83-4&_user=10&_rdoc=1&_fmt=&_orig=search&_sort=d&_docanchor=&view=c&_searchStrId=1144395716&_rerunOrigin=google&_acct=C000050221&_version=1&_urlVersion=0&_userid=10
&md5=327cf1d493757f3fc812530bad3cabb6 >.

Das et al.; "An adaptive framework for QoS routing through multiple paths in ad hoc wireless networks"; Journal of Parallel and Distributed Computing, vol. 63, 2003. pp. 141-153.

Banner et al.; "Multipath Routing Algorithms for Congestion Minimization"; IEEE/ACM Transactions on Networking, vol. 15, No. 2, Apr. 2007. pp. 413-424.

Shillingford et al.; DETOUR: Delay- and Energy-Aware Multi-Path Routing in Wireless Ad Hoc Networks; 2007; [online]. 8 pages. < URL: http://netscale.cse.nd.edu/twiki/pub/Main/PubDETOURMobitiquous07/detour.pdf >.

Morcos et al.; "M2RC: Multiplicative-increase/additive-decrease Multipath Routing Control for Wireless Sensor Networks"; [online]. 6 pages. < URL: http://www.cs.bu.edu/faculty/best/res/papers/sigbed05.pdf >.

Lou et al.; "Performance Optimization using Multipath Routing in Mobile Ad Hoc and Wireless Sensor Networks"; 2005. [online]. 29 pages. < URL: http://web.njit.edu/wins/files/lou-chapter.pdf >.

De et al.; "Meshed Multipath Routing: An Efficient Strategy in Sensor Networks"; 2003. 6 pages. [online]. < URL: http://www.cs.ucf.edu/~turgut/COURSES/EEL5937_SensorNet_Spr04/wcnc_mmpr.pdf >.

Inderscience Publishers Ltd; "International Journal of Ad Hoc and Ubiquitous Computing"; Copyright 2004-2009 Inderscience Enterprises Limited. 11 pages. [online]. [retrieved on Dec. 24, 2009]. Retrieved from the Internet: < URL: http://www.inderscience.com/coming.php?ji=145&jc=ijahuc&np=24&jn=International%20Journal%20of%20Ad%20Hoc%20and%20Ubiquitous%20Computing >.

Chuang et al.; "Minimum-Delay Energy-Efficient Source to Multisink Routing in Wireless Sensor Networks"; 2007 IEEE. 8 pages. [online]. < URL: http://portal.acm.org/citation.cfm?id=1283012 >.

Office Action (Mail Date Sep. 19, 2012) for U.S. Appl. No. 12/767,850; filed Apr. 27, 2010; Confirmation No. 4467.

Amendment filed Dec. 4, 2012 in response to Office Action (Mail Date Sep. 19, 2012) for U.S. Appl. No. 12/767,850; filed Apr. 27, 2010; Confirmation No. 4467.

Final Office Action (Mail Date Feb. 5, 2013) for U.S. Appl. No. 12/767,850; filed Apr. 27, 2010; Confirmation No. 4467.

Amendment After Final filed Apr. 2, 2013 in response to Final Office Action (Mail Date Feb. 5, 2013) for U.S. Appl. No. 12/767,850; filed Apr. 27, 2010; Confirmation No. 4467.

Notice of Allowance (Mail Date Apr. 17, 2013) for U.S. Appl. No. 12/767,850; filed Apr. 27, 2010; Confirmation No. 4467.

* cited by examiner

ADAPTIVE WIRELESS SENSOR NETWORK AND METHOD OF ROUTING DATA IN A WIRELESS SENSOR NETWORK

RELATED APPLICATIONS

This application is a continuation of U.S. patent application Ser. No. 12/767,850 filed on Apr. 27, 2010, now U.S. Pat. No. 8,514,760, issued Aug. 20, 2013.

FIELD OF THE INVENTION

The present invention relates to the field of wireless sensor networks; more specifically, it relates to a wireless sensor network and a method for routing data in a wireless sensor network.

BACKGROUND

Wireless sensor networks transmit data by hops between sensor nodes. Sending data and receiving data consume power which is generally limited in wireless sensor networks. The multiple hops add time delays to the data transmission time. Present wireless sensor networks and methods do not address both these issues simultaneously. Accordingly, there exists a need in the art to mitigate the deficiencies and limitations described hereinabove.

SUMMARY

A first aspect of the present invention is a method, comprising: (a) detecting a temporal event by a source sensor node of a wireless sensor network comprising a multiplicity of sensor nodes; (b) identifying multiple paths from the source sensor node to a sink of the wireless sensor network, the multiple paths consisting of sensor node to sensor node hops; and after (b), (c) using a processor of the source sensor node, optimizing a distribution of data packets to each path of the multiple paths by simultaneously reducing (i) power consumed by sensor nodes in each path of the multiple paths and (ii) a time to transmit the data packets from the source sensor node to the sink.

A second aspect of the present invention is a computer program product, comprising: a computer useable storage medium having a computer readable program therein, wherein the computer readable program when executed on a computer causes the computer to: (a) collect information relative to a temporal event detected by a source sensor node of a wireless sensor network comprising a multiplicity of sensor nodes; (b) identify multiple paths from the source sensor node to a sink of the wireless sensor network, the multiple paths consisting of sensor node to sensor node hops; and after (b), (c) optimize a distribution of data packets to each path of the multiple paths by simultaneously reducing (i) power consumed by sensor nodes in each path of the multiple paths and (ii) a time to transmit the data packets from the source sensor node to the sink.

A third aspect of the present invention is a wireless sensor network, comprising: a set of sensor nodes, each sensor node of the set of sensor nodes including a sensor, a processor, a memory unit, a battery and a transceiver; each sensor node of the set of sensor nodes configured to identify multiple paths from itself to a sink of the wireless sensor network, each path of the multiple paths comprising sensor node to sensor node hops; and each sensor node of the set of sensor nodes configured to optimize a distribution of data packets to each path of the multiple paths by simultaneously reducing (i) power consumed by sensor nodes in each path of the multiple paths and (ii) a time to transmit the data packets from itself to the sink.

These and other aspects of the invention are described below.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION

In the novel wireless sensor networks of the present invention, data packet routing in wireless sensor networks is an event driven temporal activity. When a sensor node detects an event in its vicinity, it becomes a source node (or source) and initiates a route discovery algorithm to a sink (e.g., a gateway node or a base station). If the data volume is greater than a predetermined data volume limit, multiple sensor node paths from the source to the sink are selected in order to reduce the amount of time to transmit all the information from the source to the sink. The information from the sensor is converted into data packets in the source node. The distribution of data packets over the various paths is computed using an optimization algorithm that adaptively addresses both data transmission delay and power consumption by optimizing the balance between power consumption and transmission delay.

Any sensor node in a wireless sensor network can act as a source but there is only one sink. The sink alone will receive all the data packets sent by the source node(s). There may be multiple source nodes transmitting data over different sets of multiple data paths at the same time to the sink. Each sensor node (n∈N) has a unique identifier. The data (D) sensed by each node is divided among the multiple paths ($\Delta_j$) such that the power consumed by all the sensor nodes in all the paths is minimized to the extent that delay time is not compromised.

Figure 1:
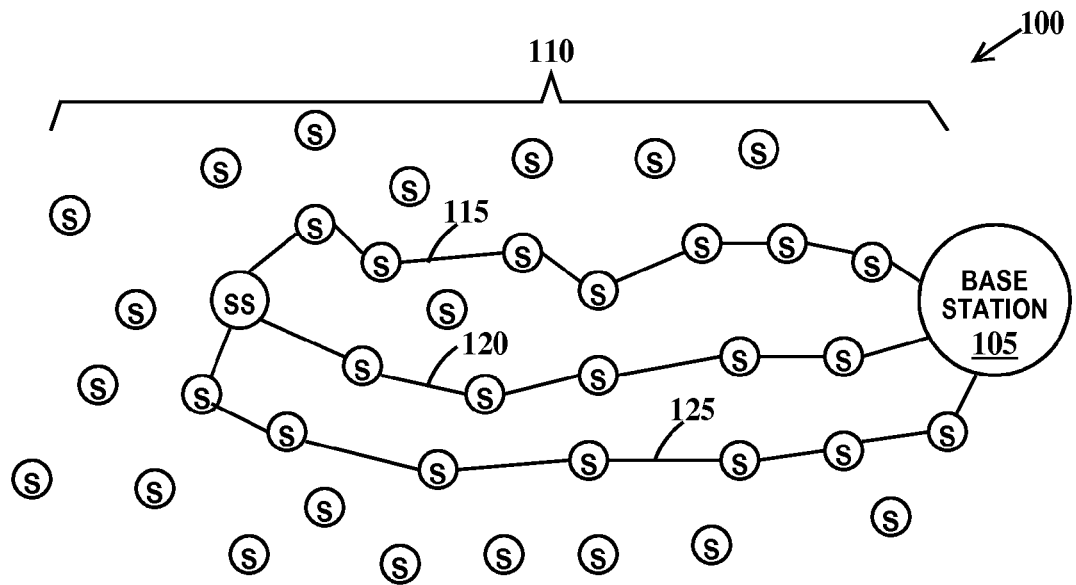
FIG. 1 illustrates a first exemplary wireless sensor network architecture according to an embodiment of the present invention.

FIG. 1 illustrates a first exemplary wireless sensor network architecture according to an embodiment of the present invention. In FIG. 1, a wireless sensor network 100 includes a base station 105 and a set of sensor nodes 110. Each sensor node is designated by the letter "S." The sensor nodes are in wireless communication, however each sensor node has a limited range, so any given sensor node can communicate only with other sensor nodes that are within communication range. In FIG. 1, base station 105 is the sink and the source is a sensor node designated by the letters "SS." In one example, base station 105 is a general purpose computer having a transceiver and a removable data and/or program storage device (e.g., magnetic media such as floppy drives and tape drives and optical media such as CD ROM drives). Wireless sensor network 100 constitutes a wireless ad-hoc network which means each sensor node supports a multi-hop routing algorithm where data collected by the source SS (in response to sensing a temporal event) is transmitted along paths indicated by the lines between various sensor nodes "S" to the sink. Each line between sensor nodes is a "hop." There are three paths 115, 120 and 125 illustrated in FIG. 1. A path is defined as a set of connected of hops from sensor node to sensor node. A hop is defined as a wireless transmission of data from a sensor node to another sensor node or to a base station or gateway node (see FIG. 2).

Figure 2:
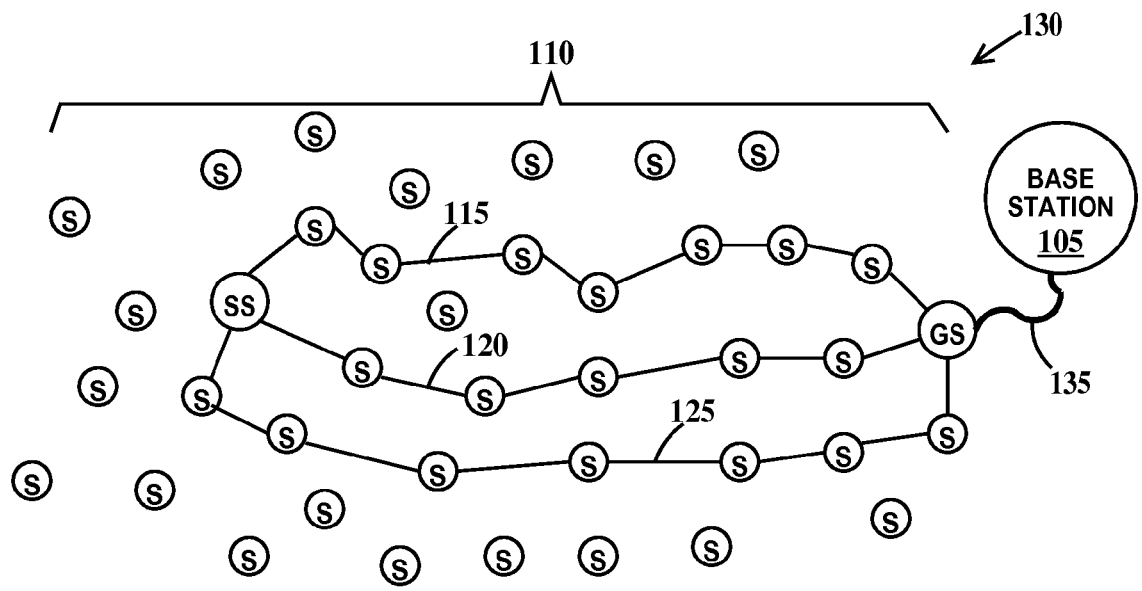
FIG. 2 illustrates a second exemplary wireless sensor network architecture according to an embodiment of the present invention.

FIG. 2 illustrates a second exemplary wireless sensor network architecture according to an embodiment of the present invention. FIG. 2 is similar to FIG. 1 except that in a wireless sensor network 130, base station 105 is not the sink, but is connected by a link 135 to a gateway sensor node designated by the letters "GS." Gateway sensor node GS may be more robust than the other sensor nodes S in terms of communication range and/or the amount of power available. Link 135 may be wireless or wired.

Figure 3:
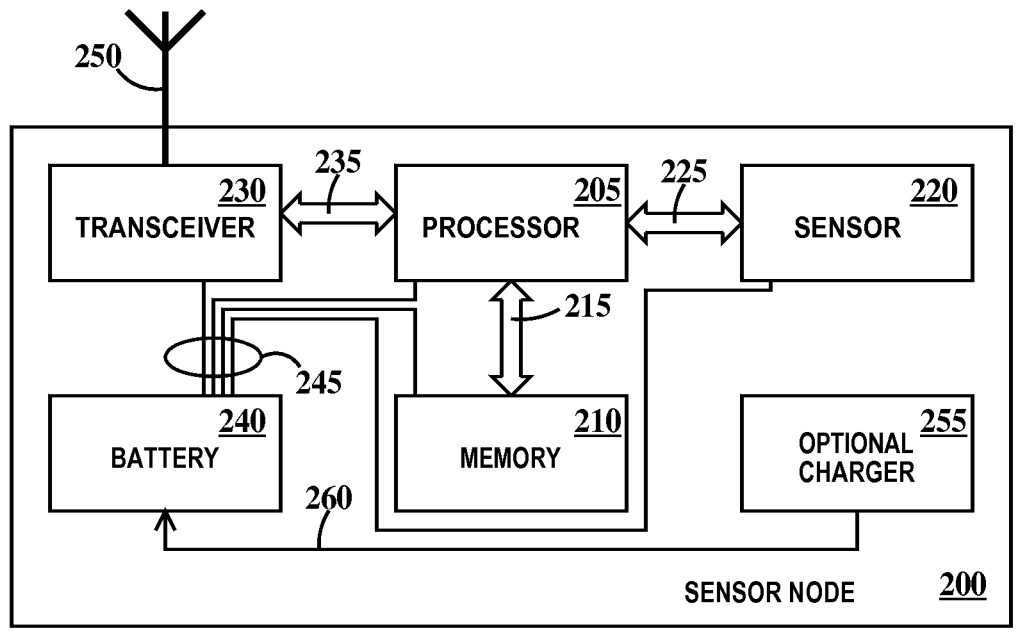
FIG. 3 illustrates an exemplary wireless sensor node according to an embodiment of the present invention.

FIG. 3 illustrates an exemplary wireless sensor node according to an embodiment of the present invention. In FIG. 3, a sensor node 200 includes a processor (e.g., microprocessor or microcontroller) 205 connected to a memory (e.g. flash memory) 210 by a bus 215, a sensor 220 connected to processor 205 by a bus 225, a transceiver 230 connected to processor 205 by a bus 235 and a battery 240 connected to processor 205, memory 210, sensor 220 and transceiver 230 by a power distribution system 245. An antenna 250 is connected to transceiver 230. Sensor node 220 may also include an optional charger (e.g., solar cell) 255 for charging battery 240. Processor 205 monitors the power level of battery 240. Processor 205 may also include embedded memory. Sensor 220 may include an analog to digital converter (ADC). There may be additional sensors 220. Sensor 220 may be (but is not limited to) a passive sensor omni-directional sensor (e.g., heat, light, vibration, a passive narrow beam sensor (e.g., camera or laser) or an active sensor (e.g., sonar or radar). Transceiver 230 may be a radio frequency, an optical or an infrared transceiver.

Figure 4:
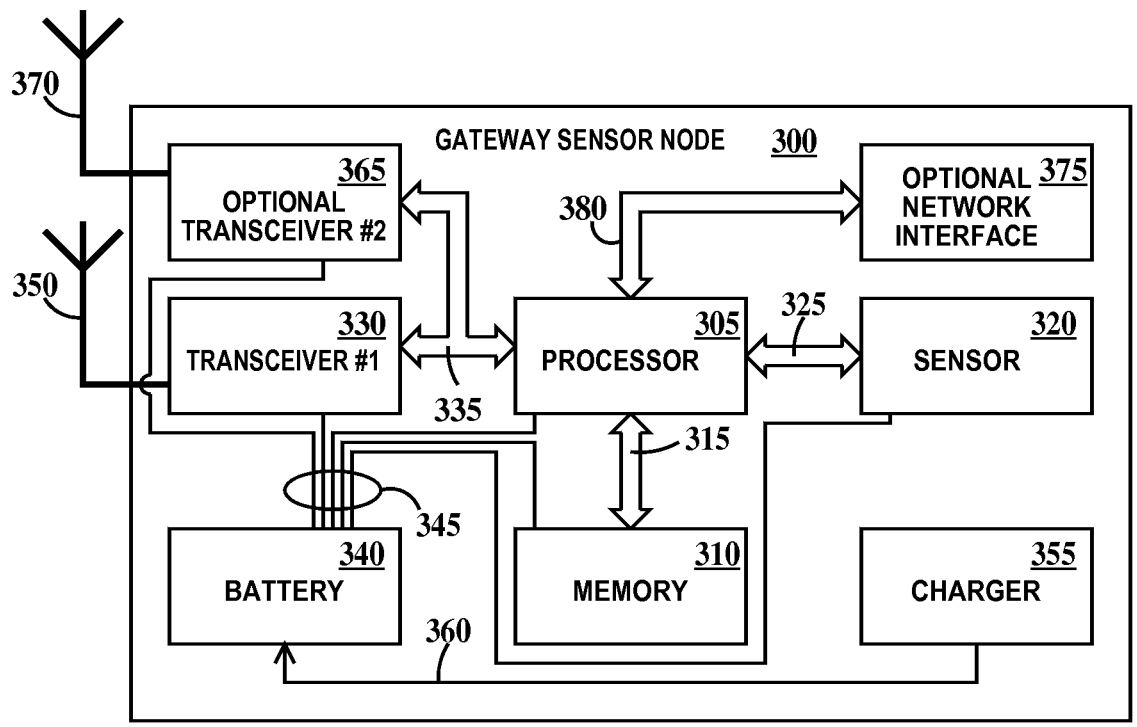
FIG. 4 illustrates an exemplary wireless sensor gateway node according to an embodiment of the present invention.

FIG. 4 illustrates an exemplary wireless sensor gateway node according to an embodiment of the present invention. In FIG. 3, a gateway sensor node 300 includes a processor (e.g., microprocessor or microcontroller) 305 connected to a memory (e.g. flash memory) 310 by a bus 315, a sensor 320 connected to processor 305 by a bus 325, a first transceiver 330 connected to processor 305 by a bus 335 and a battery 340 connected to processor 305, memory 310, sensor 320 and transceiver 330 by a power distribution system 445. An antenna 350 is connected to first transceiver 330. Sensor node 320 may also include an optional charger (e.g., solar cell) 335 for charging battery 340. Processor 305 monitors the power level of battery 340. Processor 305 may also include embedded memory. Sensor 320 may include an analog to digital converter (ADC). There may be additional sensors 320. Sensor 320 may be (but is not limited to) a passive sensor omni-directional sensor (e.g., heat, light, vibration, a passive narrow beam sensor (e.g., camera or laser) or an active sensor (e.g., sonar or radar). First transceiver 330 may be a radio frequency, an optical or an infrared transceiver. Gateway sensor 300 may include an optional second transceiver 365 and antenna 370 connected to processor 305 by bus 335. First transceiver 330 may be a radio frequency, an optical or an infrared transceiver. Optional second transceiver 365 may be a short range transceiver used to communicate with other sensor nodes and second transceiver 355 may be a long range transceiver used to communicate with a base station. Gateway sensor 300 may include an optional network interface 375 connected to processor 305 by a bus 380. Optional network interface 375 provides an optional wired connection to a base station.

Sensors of sensor nodes according to embodiments of the present invention include, but are not limited to, environmental sensors (e.g., temperature, pressure, wind speed, wind direction, light intensity, detection of chemicals and detection of radiation) and monitoring and surveillance sensors (e.g., vehicle presence and/or movement and/or human presence and/or movement).

Power consumption in a wireless sensor network according to embodiments of the present invention is categorized into two parts. The first part is power consumed by processing (by the processor and memory) and sensing (by the sensor). The second part is power consumed by transmitting and receiving data packets (i.e., communication delay). Given j paths, the lifespan of the $j^{th}$ path is $P_{jmin}$ and is defined as the power remaining to the sensor node with the least amount of remaining power in the $j^{th}$ path. $P_{jmin}$ thus defines the maximum lifespan of the $j^{th}$ path. For a path to be stable, $P_{jmin}$ must be equal to or less than the power that will be consumed during the time it takes to transmit all the data packets assigned to the $j^{th}$ path, Power consumption at each sensor node due to processing and sensing in the $j^{th}$ path is given by:

$$K_r = n_j * t_j \quad (1)$$

where $K_r$ is the effective rate of power loss from a node due to processing and sensing (joule/second);

$n_j$ is the number of sensor nodes in the $j^{th}$ path; and $t_j$ is the time the path is in use for transmitting data packets.

The time delay per data packet per hop is given by:

$$\tau_j = q_j + 1/B_j \quad (2)$$

where $\tau_j$ is the average delay/packet/hop for $j^{th}$ path (seconds/packet/hop);

$q_j$ is the average queuing delay in $j^{th}$ path; and $B_j$ is the bit rate of the $j^{th}$ path (in packets/seconds).

The power consumed for transmission and reception of data packets over the $j^{th}$ path is given by:

$$p_j = 2 * \Delta_j * tp_j * H_j \quad (3)$$

where $p_j$ is the power consumed in the $j^{th}$ path;

$tp_j$ is the transmission power/packet/hop for $j^{th}$ path (joules/packet/hop);

$\Delta_j$ is the number of data packets transmitted over the $j^{th}$ path; and $H_j$ is the number of hops in the j$^{th}$ path.

The "2" is because the node must receive and then transmit the data packets.

Comparing equations (1) and (3) $K_r$ is seen to be independent of data packet transmission/reception related energy consumption, so $K_r$ need not be considered in the distribution of data packets to the various paths.

As the data packets are routed simultaneously over the j paths, the communication delay is not the sum of the individual path delays. Instead, the communication delay can be estimated as the maximum of the individual delay paths. Path delay consists of two components. The first is queuing and processing delay (the average queuing delay/packet/hop for the j$^{th}$ path. The second is transmission/reception delay. The source to sink transmission delay (message switching assumed) for the j$^{th}$ path is given by:

$$TD_j = \Delta_j * \tau_j * H_j * p_j \quad (4)$$

where $TD_j$ is the source to sink delay of the j$^{th}$ path;
$\Delta_j$ is the number of data packets transmitted over the j$^{th}$ path
$\tau_j = q_j + 1/B_j$ (equation 2);
$H_j$ is the number of hops in the j$^{th}$ path; and
$p_j = 1$ if a path is selected else $p_j = 0$.

Thus, the total delay from source to sink transmission delay (message switching assumed) is given by:

$$TD = \max[(\Delta_j * \tau_j * H_j * p_j)] \quad (5).$$

When a sensor node detects an event in its vicinity it becomes a source node, generates a set of data packets describing the event, and if the number of data packets is greater than a predetermined number, executes a multipath route discovery algorithm to the sink node. Examples of multipath routing algorithms are described in "Multipath Routing Algorithms for Congestion Minimization" by Banner and Orda, IEEE/ACM Transactions on Networking, Vol. 15, No. 2, April 2007, which is hereby incorporated by reference.

The total data volume D is thus divided into datasets $\Delta_j$, which are distributed over the multiple paths. Data packet distribution is computed using an optimization algorithm given by:

$$Z = \Sigma_j (2 * \Delta_j * tp_j * H_j * p_j) \quad (6)$$

where Z is the objective function; and
$\Delta_j$, $H_j$ and $p_j$ have been described supra.

The constraints of the optimization problem are:

$$\Sigma_j \Delta_j = D \quad (7)$$

$$\max[(\Delta_j * \tau_j * H_j * p_j)] \leq \{[D * \tau_{stab} * H_{stab} * p_j] + [\max[(D/n_j * \Delta_j * H_j * p_j)]\}/2 \quad (8)$$

$$2 * \Delta_j * tp_j + K_r * \max(\Delta_j * \tau_j * H_j * p_j) < P_{jmin} \quad (9)$$

where $\Delta_j$, $H_j$, $p_j$, D, $tp_j$, $p_j$, $P_{jmin}$ have been described supra;
$\tau_{stab}$ is the average delay/packet/hop for the maximum life span path (seconds/packet/hop); and
$H_{stab}$ is the number of hop counts for the maximum life-span path.

Equation (7) requires the total data number of packets must be distributed among multiple paths. Inequality (8) requires that the average delay from the source to the sink is less than a predefined maximum value. Inequality (9) requires that the life-span of a path should be sufficient to transmit the entire volume of data packets sent over it without interruption.

A sensor node must have sufficient amount of energy to be able to receive all the data packets from a previous sensor node and successively transmit all the data packets received to a subsequent node which is covered by the term $(2 * \Delta_j * tp_j)$. Also the node immediately prior to the sink (terminating node) has to have sufficient power to survive the entire amount of time it will take for all data packets sent along the path to be received and transmitted to the sink, (i.e., the survival time of the terminating node equals to the net end-to-end delay). During this time the terminating node dissipates energy at a rate of $K_r$. So, the term $K_r * \max(\Delta_j * \tau_j * H_j * p_j)$ accounts for the amount of power that is dissipated in the terminal node (i.e., the sensor node before the sink).

In the interval of time that it takes to transmit data packets from the source to the sink, the power consumption of each node taking part in data packet transmissions decreases by $(2 * \Delta_j * tp_j) + K_r * \max[(\Delta_j * \tau_j * H_j * p_j)]$ and the power of any node not taking part in data packet transmission decreases by $K_r * \max[(\Delta_j * \tau_j * H_j * p_j)]$.

Figure 5:
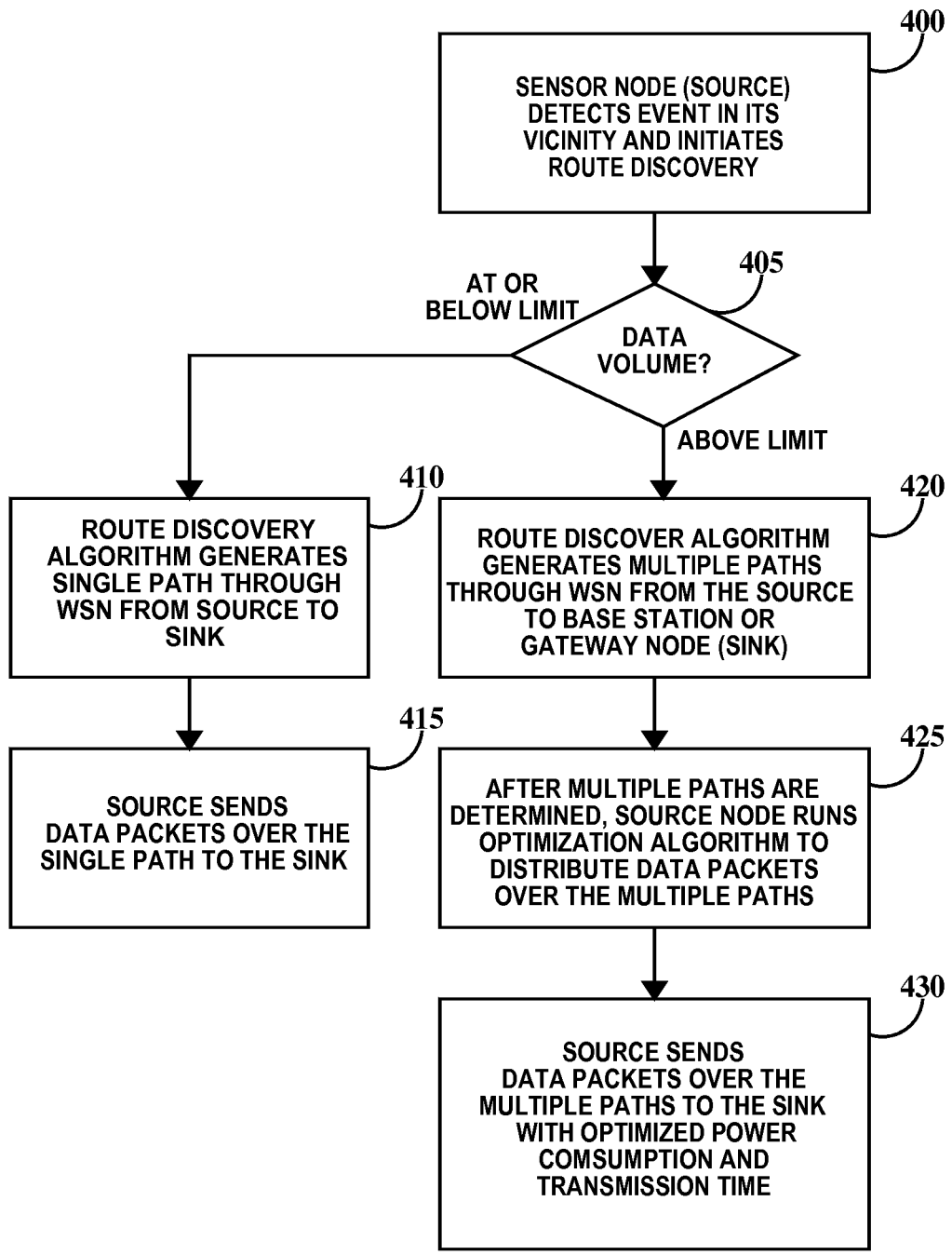
FIG. 5 is a general flowchart of a method for routing data in a wireless sensor network according to an embodiment of the present invention.

FIG. 5 is a general flowchart of a method for routing data in a wireless sensor network according to an embodiment of the present invention. In step 400, a sensor node (now source) detects a temporal event in its vicinity and initiates route discovery. In step 405, it is determined if the volume of data to be transmitted is below or above a preset limit. If the data volume is at or below the preset limit, then the method proceeds to step 410. In step 410, the route discovery algorithm generates a single path through the wireless sensor network (WSN). Then, in step 415, the source sends the data packets over the WSN to the sink. Steps 410 and 415 are essentially scheme (1) described infra.

Returning to step 405. If the data volume is above the preset limit, then the method proceeds to step 420. In step 420, the route discovery algorithm generates multiple paths from the source through the WSN to the sink. Next, in step 425 the source runs the optimization algorithm to distribute the data packets over the multiple paths. Next, in step 430, the source sends the data packets over the multiple paths with transmission time and power consumption being optimized with respect to each other. Steps 420, 425 and 430 are essentially scheme (3) described infra and are illustrated in more detail in FIGS. 6, 7 and 8 described infra.

Figure 6:
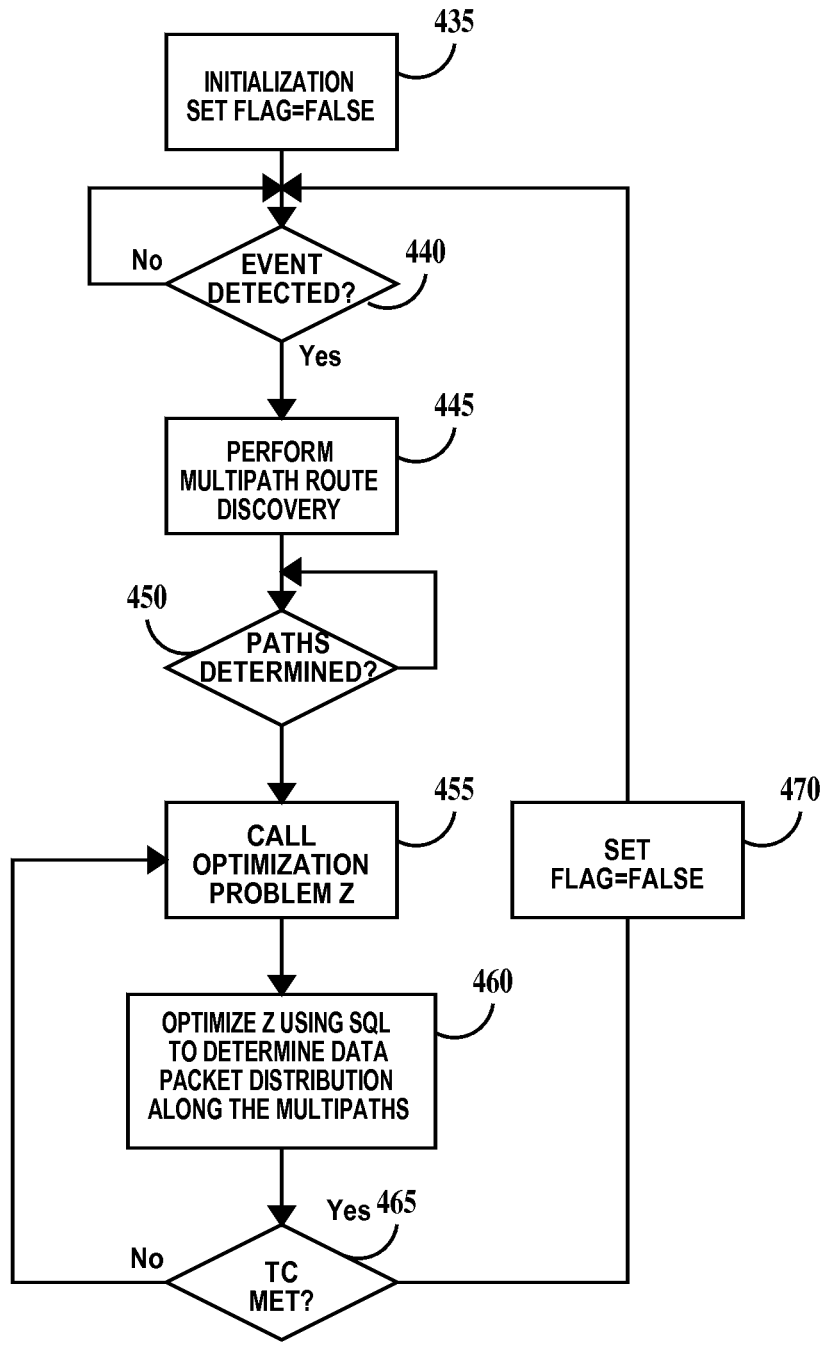
FIG. 6 is a detailed flowchart of a method for routing data in a wireless sensor network according to an embodiment of the present invention.

FIG. 6 is a detailed flowchart of a method for routing data in a wireless sensor network according to an embodiment of the present invention. In step 435, the sensor node is initiated. An event detection flag is set to indicate no event detected (SET FLAG=FALSE). Step 440, it a wait for event loop. A periodic sample of the state of the sensor is performed in step 440. If in step 440 an event is detected, then in step 445 SET FLAG=TRUE is issued and route discovery is initiated by calling a multipath discovery algorithm to determine paths (P). The route multipath discovery algorithm determiners (a) node-disjoint multi-paths, (b) parameters $H_j$, $tp_j$ and $\tau_j$ for each j$^{th}$ path, (c) lifespan of the particular paths, and (d) the most stable (i.e., maximum lifetime) path. Step 450 is a wait for all paths to be determined step. A periodic sample of the state of the multipath routing algorithm is performed in step 450. If all paths are determined, the method proceeds to step 455. In step 455 the optimization problem Z (equation 6, with constraints 7, 8 and 9) is called with input described supra. In step 460, a sequential quadratic programming (SQP) algorithm is called to operate on Z to determine the $\Delta_j$s (the number of data packets transmitted over each j$^{th}$ path). In step 465, it is determined if SQL termination criteria (TC) is met. SQL is a robust algorithm for nonlinear continuous optimization. SQL iterates until a desired level of convergence is reached (the termination criteria). Alternative non-linear continuous optimization methods may be used. If termination criteria is not met, then the method loops to step 455 otherwise the method proceeds to step 470 to reset the sensor node with SET FLAG=FALSE and the method then loops back to step 440.

Figure 7:
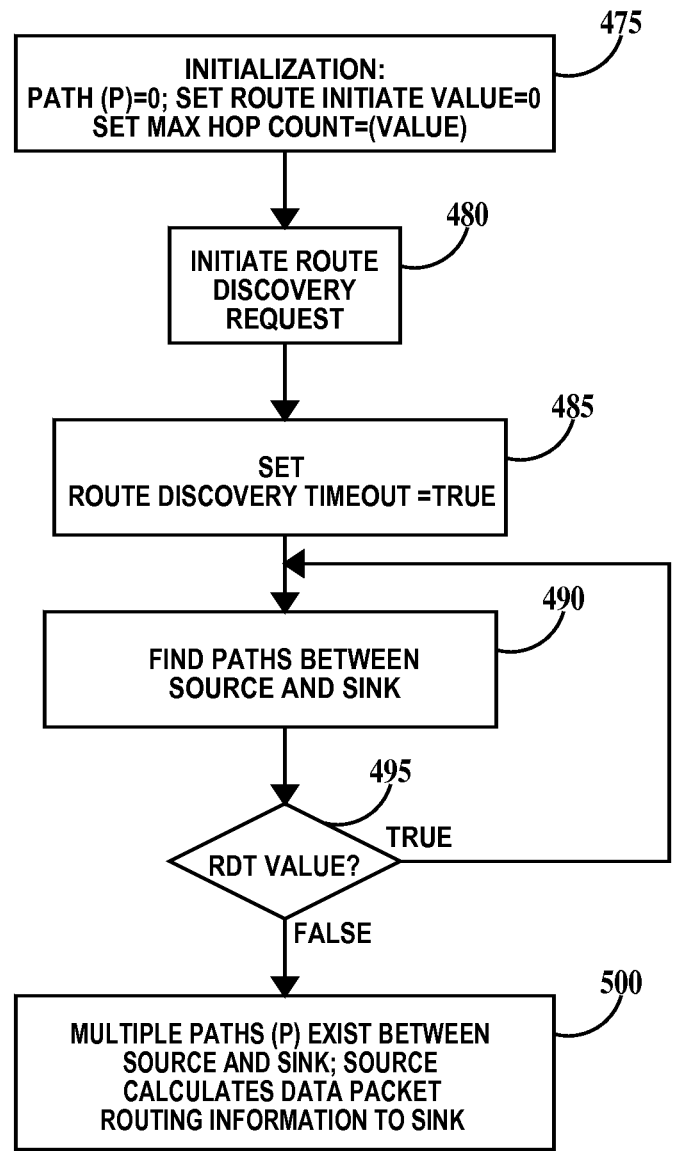
FIG. 7 is a flowchart of the path determination step of the flowchart of FIG. 6.

FIG. 7 is a flowchart of the path determination step 445 of the flowchart of FIG. 6. In step 475, multipath routing algorithm parameters are initialized. The paths are initialized by (P)=0. The route initiate parameter is initialed by a SET ROUTE INITATE=0 instruction. And a maximum number of hops is set by SET MAX HOP COUNT=(VALUE) instruction. In step 480, a route discovery request is initiated. In step 485 a path solution monitor is initiated by a SET ROUTE DISCOVERY TIMEOUT=TRUE instruction. In step 490 the multipath route discovery algorithm is run to find paths between the source and sink. When a solution is found, the instruction SET ROUTE DISCOVERY TIMEOUT=FALSE is executed. Step 495 checks the value of the SET ROUTE DISCOVERY TIMEOUT parameter and waits on a value of TRUE and proceeds to step 500 on a value of FALSE. In step 500, multiple paths (P) exist between the source and sink, and the source can calculate data packet information (e.g. packet header data) for the various paths from the source to the sink.

Figure 8:
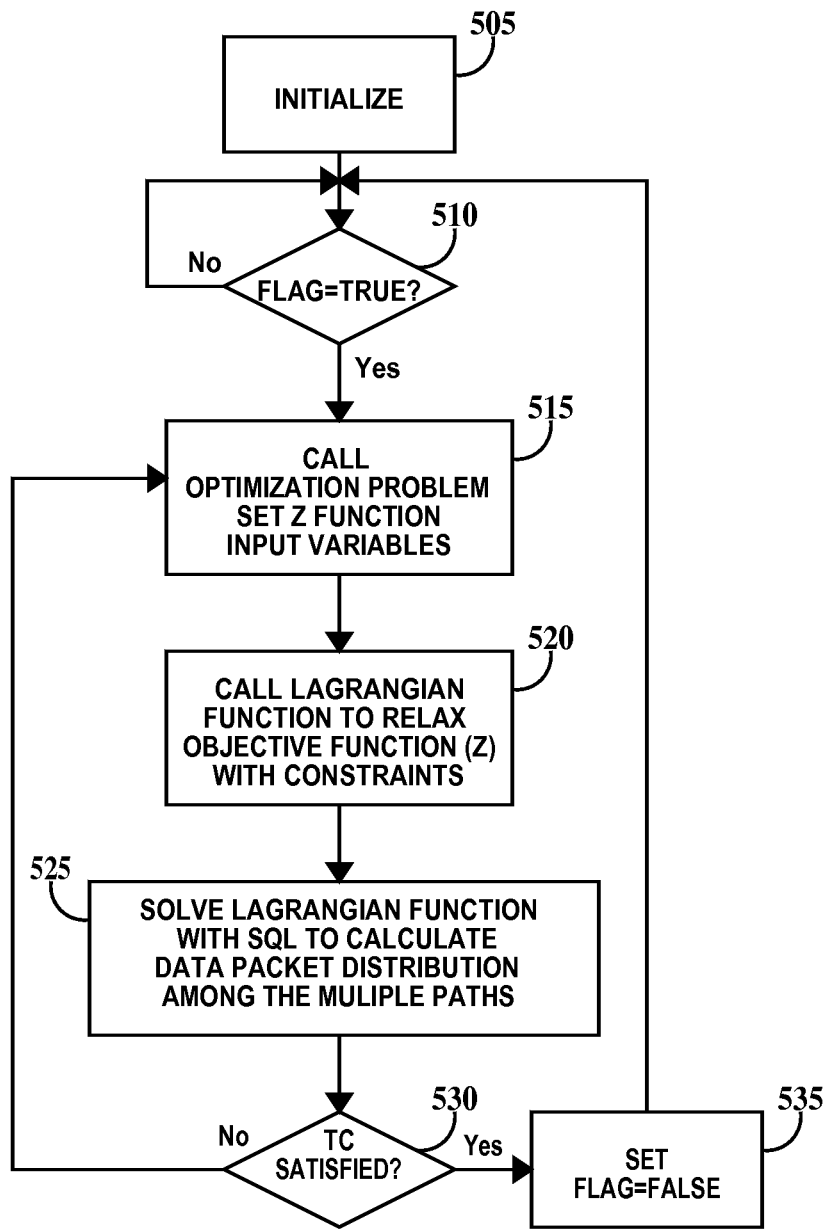
FIG. 8 is a flowchart of the optimization step of the flowchart of FIG. 6.

FIG. 8 is a flowchart of the optimization step 455 of the flowchart of FIG. 6. In step 505, a perform optimization flag is set to indicate whether or not optimization is to be performed. Step 510, it a wait for an optimization start command loop. A periodic sample of the value of SET FLAG is performed in step 510. If in step 510 FLAG=TRUE, then the method proceeds to step 515. In step 515, the optimization problem Z is called with the set of input variables discussed supra. In step 520, the Lagrangian function is called to relax the objective function (Z) of equation (6) with the three constraints (7), (6) and (9) discussed supra. In step 525, a Lagrangian function is solved with SQL to calculate data packet distribution among the multiple data paths. In step 530, it is determined if the terminal criteria (TC) is met. If the terminal criteria not met, the method loops back to step 515 otherwise the method proceeds to step 535. In step 535, SET FLAGE=FALSE is executed and the method loops back to step 510.

In order to test and verify the embodiments of the present invention, the power consumption of three schemes were simulated. The first scheme is a single-path scheme. The second scheme is a multipath with equal numbers of data packets. The third scheme is the novel multipath and data packet number optimized scheme according to embodiments of the present invention.

In the first, single path scheme (1), the maximum delay=delay caused in a single most stable path if the entire data volume are sent through it (i.e., max $[(\Delta_j * \tau_j * H_j * p_j)] \leq ([D * \tau_{stab} * H_{stab} * p_j])$. In the first scheme the upper limit of transmission delay is high and the constraint will be satisfied in most cases.

In the second, multipath equal data packet size scheme (2) the maximum delay=total delay if the data is equally distributed over all the paths (i.e., max $[(\Delta_j * \tau_j * H_j * p_j)] \leq [\max (D/n_j * \tau_j * H_j * p_j)]$, where n=number of spatial paths). In the second scheme, the upper limit of transmission delay is low and consequently the constraint is very restrictive.

In the third, novel multipath and data packet number optimized scheme (3) the upper limit of delay constraint as the average of values of the upper limits proposed in schemes 1 and 2. The optimization problem of equation (6) has been subsequently solved using an SQP technique.

A simulation program was developed using MATLAB. MATLAB stands for "Matrix Laboratory" and is a numerical computing environment and fourth-generation programming language. Developed by "The MathWorks", MATLAB allows matrix manipulations, plotting of functions and data, implementation of algorithms, creation of user interfaces, and interfacing with programs written in other languages, including C, C++, and Fortran. First the simulation program runs a route discovery algorithm in an area of 15 by 15 square meters where 192 sensor nodes are deployed randomly. Each of the sensor nodes had a transmission radius of 2.4 meters. The sensor nodes were models based on MICA2 motes available from Crossbow of Milpitas, Ca, USA. The routing algorithm gives five possible paths between the source and sink with the parameters listed in TABLE I:

TABLE I

| Parameter | Value | | | |
|---|---|---|---|---|
| Hop Count | 8 | 9 | 9 | 10 | 10 |
| Available Power | 23,760 joules for all 192 motes | | | |
| Transmission power/packet/hop | 1.4 milli-joules for all paths | | | |
| Delay/packet/hop | 0.068 s | 0.0681 s | 0.945 s | 0.0776 s | 0.0641 s |
| Bit rate | 43 packets/second or 12.4 kbps for all | | | |
| $K_r$ | 0.024 watts (assuming 40% duty cycle) | | | |

With these input parameters, the optimization algorithm divides data over the paths for a optimal power consumption relative to transmission delay. The overall power consumption and transmission delay are calculated and compared with corresponding values derived by simulating schemes (1) and (2). The results are shown in FIGS. 9 and 10.

Figure 9:
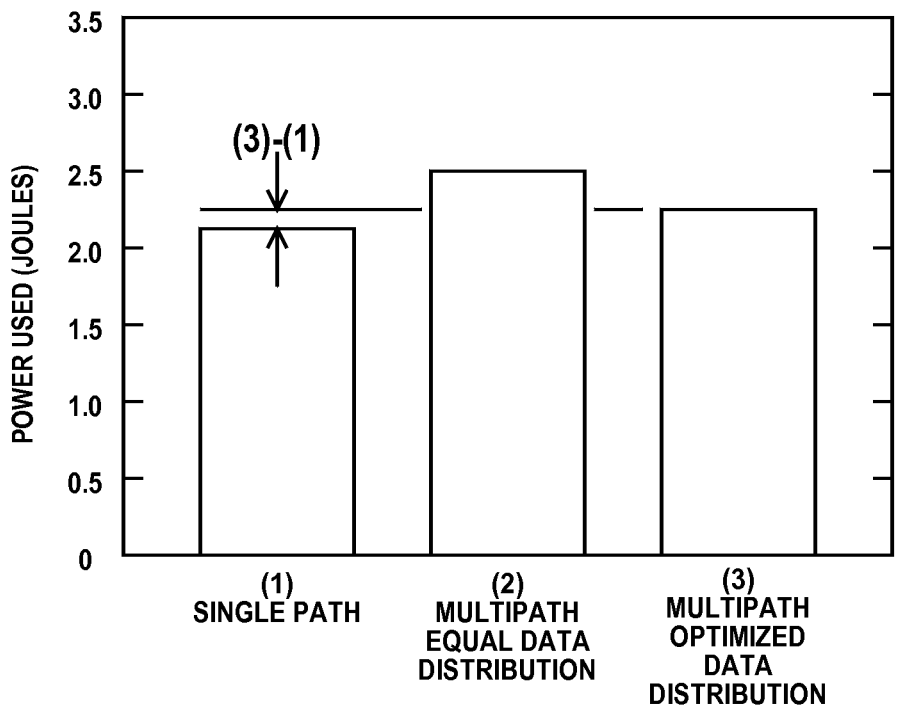
FIG. 9 is a chart comparing power consumption of a multipath and data packet number optimized scheme according to embodiments of the present invention (3) to a single-path scheme (1) and to a multipath equal data packet size scheme (2)

FIG. 9 is a chart comparing power consumption of a multipath and data packet number optimized scheme according to embodiments of the present invention (3) to a single-path scheme (1) and to a multipath equal data packet size scheme (2). In FIG. 9, power consumption is at a minimum when the entire data volume is sent through a single most stable path; scheme (1). However, power utilization of the novel scheme (3) does not far exceed that. Power utilization is at maximum when the entire data is equally distributed among the five paths; scheme (2).

Figure 10:
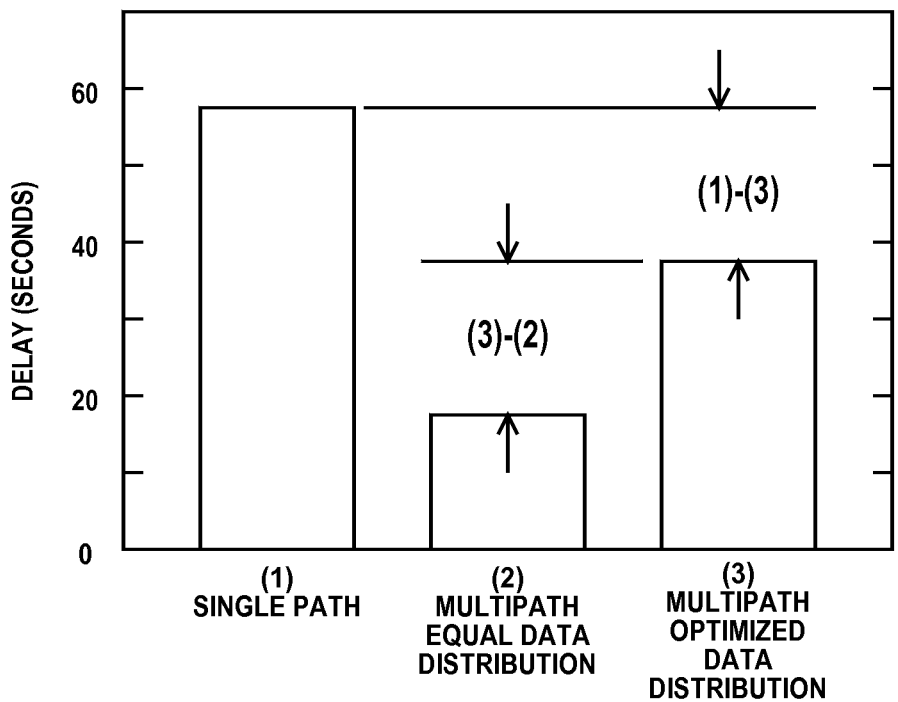
FIG. 10 is a chart comparing data transmission delay of a multipath and data packet number optimized scheme according to embodiments of the present invention (3) to a single-path scheme (1) and to a multipath equal data packet size scheme (2).

FIG. 10 is a chart comparing data transmission delay of a multipath and data packet number optimized scheme according to embodiments of the present invention (3) to a single-path scheme (1) and to a multipath equal data packet size scheme (2). In FIG. 10, scheme 2 has the least delay of the three schemes. Scheme 1 has the most delay of the three schemes. The delay caused by scheme (3), the novel scheme, is between that of schemes (1) and (2). Taking FIGS. 9 and 10 together, it is clear that both power consumption and transmission delay cannot both be minimized simultaneously. However, the balance between power consumption and transmission delay is optimized in scheme (3), the novel scheme according to embodiments of the present invention.

Generally, the method described herein with respect to a method for routing data in a wireless sensor network is practiced as a distributed algorithm and the methods described supra in the flow diagrams FIGS. 5, 6, 7 and 8 may be coded as a set of computer executable code and stored in memories of on the sensor nodes, gateway nodes and base stations of a wireless sensor network.

As will be appreciated by one skilled in the art, aspects of the present invention may be embodied as a wireless sensor network, method of routing of data packets in a wireless sensor network or a computer program product having computer readable program code for routing of data packets in a wireless sensor network embodied thereon. Accordingly, aspects of the present invention may take the form of an entirely hardware embodiment, an entirely software embodiment (including firmware, resident software, micro-code, etc.) or an embodiment combining software and hardware aspects that may all generally be referred to herein as a sensor node, gateway node or base station which may be a general purpose computer.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The algorithms may be encoded on the computer program product as executable code which may then be loaded into the memory devices of sensor nodes of the wireless sensor network from a removable data and/or program storage device of the base station before or after deployment of the sensor and gateway nodes through their respective transceivers. Alternatively, the algorithms may be encoded on the computer program product as executable code which may then be loaded into the memory devices of sensor nodes of the wireless sensor network from a removable data and/or program storage device of a general purpose computer before deployment of the sensor and gateway nodes through their respective transceivers. Alternatively, the algorithms may be encoded on the computer program product as executable code may be loaded into the memory devices of sensor nodes during a programming step during fabrication of the sensor nodes either through their respective transceivers or by wired access to their respective memory devices.

Thus the embodiments of the present invention provide a wireless sensor network and method of transmitting data over a wireless sensor network that adaptively addresses both data transmission delay and power consumption by optimizing the balance between power consumption and transmission delay.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:
   (a) detecting a temporal event by a source sensor node of a wireless sensor network comprising a multiplicity of sensor nodes;
   (b) in response to said source sensor detecting said temporal event, said source sensor converting data relating to the temporal event to a set of data packets and identifying multiple paths from said source sensor node to a sink of said wireless sensor network, said multiple paths consisting of sensor node to sensor node hops; and
   after (b), (c) using a processor of said source sensor node, said source node determining a distribution of each data packet of said set of data packets among each path of said multiple paths by simultaneously reducing (i) power consumed by sensor nodes in each path of said multiple paths and (ii) a time to transmit said data packets from said source sensor node to said sink using an optimization algorithm that optimizes the balance between power consumption of each path of said multiple paths and transmission delay through each path of said multiple paths.

2. The method of claim 1, further including:
   after (c), (d) simultaneously transmitting different data packets of said set of data packets over each path of said multiple paths from said source sensor node to said sink.

3. The method of claim 2, further including:
   between (a) and (b), determining if an amount of data to be transmitted from said source sensor node to said sink exceeds a predetermined limit;
   if said amount of data exceeds said predetermined limit performing (b), (c) and (d); and
   if said amount of data is at or below said predetermined limit determining a single path from said source sensor node to said sink, and transmitting data packets containing said data over said single path from said source sensor node to said sink.

4. The method of claim 1, wherein (c) includes:
   initialing an optimization equation and a set of constraints for solutions to said optimization equation;
   performing a Lagrangian function to relax said optimization equation using said constraints; and
   solving said Lagrangian function for data packet distribution for each path of said multiple paths.

5. The method of claim 4, further including:
   using sequential quadratic programming to solve said Lagrangian function.

6. The method of claim 1, wherein said optimizing a distribution of data packets includes:
   determining power consumption for each sensor node in each path of said multiple paths;
   determining power consumed for transmission and reception of data packets over each path of said multiple paths;
   determining a time delay for each hop of each path of said multiple paths;
   determining a maximum allowable amount of time for transmission of data packets from said source sensor node to said sink;
   determining lifespans for each path of said multiple paths based on an amount of power of a sensor node of each path having a least amount of power remaining; and
   determining a most stable path based on said lifespans of each path of said multiple paths.

7. The method of claim 1, wherein said optimizing the balance between power consumption of each path of said multiple paths and transmission delay through each path of said multiple paths is performed by said processor performing calculations using the following using the equation:

$$Z=\Sigma_j(2*\Delta_j*tp_j*H_j*p_j)$$

and applying the constraints $$\Sigma_j\Delta_j=D;$$

$$\max[(\Delta_j*\tau_j*H_j*p_j)]\leq\{[D*\tau_{stab}*H_{stab}*p_j]+[\max[(D/n_j*\Delta_j*H_j*p_j)]\}/2; \text{ and}$$

$$2*\Delta_j*tp_j+K_r*\max(\Delta_j*\tau_j*H_j*p_j)<P_{jmin}; \text{ and}$$

where
- Z is the objective function;
- D is the total data volume to be transmitted;
- $K_r=n_j*t_j$;
- $K_r$ is the effective rate of power loss from a node due to processing and sensing (joule/second);
- $n_j$ is the number of sensor nodes in the $j^{th}$ path;
- $t_j$ is the time the path is in use for transmitting data packets;
- $\tau_j=q_j+1/B_j$;
- $\tau_j$ is the average delay/packet/hop for $j^{th}$ path (seconds/packet/hop);
- $q_j$ is the average queuing delay in $j^{th}$ path;
- $B_j$ is the bit rate of the $j^{th}$ path (in packets/seconds);
- $p_j=2*\Delta_j*tp_j*H_j$;
- $p_j$ is the power consumed in the $j^{th}$ path;
- $tp_j$ is the transmission power/packet/hop for $j^{th}$ path (joules/packet/hop);
- $\Delta_j$ is the number of data packets transmitted over the $j^{th}$ path;
- $H_j$ is the number of hops in the $j^{th}$ path;
- $P_{jmin}$ is the power remaining to the sensor node with the least amount of remaining power in the $j^{th}$ path;
- $\tau_{stab}$ is the average delay/packet/hop for the maximum life span path (seconds/packet/hop); and
- $H_{stab}$ is the number of hop counts for the maximum life-span path; and wherein a result of said calculation is said multiple paths.

8. The method of claim 1, further including:
transmitting the entire set of data packets from said source sensor node to said sink along a single path when an amount data to be transmitted is at or below a predetermined limit.

9. The method of claim 1, wherein said optimizing a distribution of data packets includes:
determining one or more of (i) power consumed for transmission and reception of data packets over each path of said multiple paths, (ii) lifespans for each path of said multiple paths based on an amount of power of a sensor node of each path having a least amount of power remaining and (iii) a most stable path based on said lifespans of each path of said multiple paths.

10. A computer program product, comprising:
a computer readable storage device/memory having a computer readable program therein, wherein the computer readable program when executed on a computer causes the computer to:
(a) collect information relative to a temporal event detected by a source sensor node of a wireless sensor network comprising a multiplicity of sensor nodes;
(b) in response to said source sensor detecting said temporal event, said source sensor converting data relating to the temporal event to a set of data packets and identifying multiple paths from said source sensor node to a sink of said wireless sensor network, said multiple paths consisting of sensor node to sensor node hops; and
after (b), (c) using a processor of said source sensor node, said source node determining a distribution of each data packet of said set of data packets among each path of said multiple paths by simultaneously reducing (i) power consumed by sensor nodes in each path of said multiple paths and (ii) a time to transmit said data packets from said source sensor node to said sink using an optimization algorithm that optimizes the balance between power consumption of each path of said multiple paths and transmission delay through each path of said multiple paths.

11. The computer program product of claim 10, the method further including:
after (c), (d) simultaneously transmitting different data packets of said set of data packets over each path of said multiple paths from said source sensor node to said sink.

12. The computer program product of claim 11, the method further including:
between (a) and (b), determining if an amount of data to be transmitted from said source sensor node to said sink exceeds a predetermined limit;
if said amount of data exceeds said predetermined limit performing (b), (c) and (d); and
if said amount of data is at or below said predetermined limit determining a single path from said source sensor node to said sink, and transmitting data packets containing said data over said single path from said source sensor node to said sink.

13. The computer program product of claim 10, wherein the method step (c) includes:
initialing an optimization equation and a set of constraints for solutions to said optimization equation;
performing a Lagrangian function to relax said optimization equation using said constraints; and
solving said Lagrangian function for data packet distribution for each path of said multiple paths.

14. The computer program product of claim 13, the method further including:
using sequential quadratic programming to solve said Lagrangian function.

15. The computer program product of claim 10, wherein said method step (c) includes:
determining power consumption for each sensor node in each path of said multiple paths;
determining power consumed for transmission and reception of data packets over each path of said multiple paths;
determining a time delay for each hop of each path of said multiple paths;
determining a maximum allowable amount of time for transmission of data packets from said source sensor node to said sink;
determining lifespans for each path of said multiple paths based on an amount of power of a sensor node of each path having a least amount of power remaining; and
determining a most stable path based on said lifespans of each path of said multiple paths.

16. The computer program product of claim 10, wherein said optimizing the balance between power consumption of each path of said multiple paths and transmission delay through each path of said multiple paths is performed by said processor performing calculations using the following using the equation:

$$Z = \Sigma_j (2 * \Delta_j * tp_j * H_j * p_j)$$

and applying the constraints $$\Sigma_j \Delta_j = D;$$

$$\max[(\Delta_j * \tau_j * H_j * p_j)] \leq \{[D * \tau_{stab} * H_{stab} * p_j] + [\max[(D/n_j * \Delta_j * H_j * p_j)]\}/2; \text{ and}$$

$$2 * \Delta_j * tp_j + K_r * \max(\Delta_j * \tau_j * H_j * p_j) < P_{jmin}; \text{ and}$$

where
- Z is the objective function;
- D is the total data volume to be transmitted;
- $K_r = n_j * t_j$;
- $K_r$ is the effective rate of power loss from a node due to processing and sensing (joule/second);
- $n_j$ is the number of sensor nodes in the $j^{th}$ path;
- $t_j$ is the time the path is in use for transmitting data packets;
- $\tau_j = q_j + 1/B_j$;
- $\tau_j$ is the average delay/packet/hop for $j^{th}$ path (seconds/packet/hop);
- $q_j$ is the average queuing delay in $j^{th}$ path;
- $B_j$ is the bit rate of the $j^{th}$ path (in packets/seconds);
- $p_j = 2 * \Delta_j * tp_j * H_j$;
- $p_j$ is the power consumed in the $j^{th}$ path;
- $tp_j$ is the transmission power/packet/hop for $j^{th}$ path (joules/packet/hop);
- $\Delta_j$ is the number of data packets transmitted over the $j^{th}$ path;
- $H_j$ is the number of hops in the $j^{th}$ path;
- $P_{jmin}$ is the power remaining to the sensor node with the least amount of remaining power in the $j^{th}$ path;
- $\tau_{stab}$ is the average delay/packet/hop for the maximum life span path (seconds/packet/hop); and
- $H_{stab}$ is the number of hop counts for the maximum life-span path; and wherein a result of said calculation is said multiple paths.

17. The computer program product of claim 10, the method further including:
transmitting the entire set of data packets from said source sensor node to said sink along a single path when an amount data to be transmitted is at or below a predetermined limit.

18. The computer program product of claim 10, wherein said method step (c) includes:
determining one or more of (i) power consumed for transmission and reception of data packets over each path of said multiple paths, (ii) lifespans for each path of said multiple paths based on an amount of power of a sensor node of each path having a least amount of power remaining and (iii) a most stable path based on lifespans of each path of said multiple paths.

19. A wireless sensor network, comprising:
a set of sensor nodes, each sensor node of said set of sensor nodes including a sensor, a processor, a memory unit, a battery and a transceiver;
each sensor node of said set of sensor nodes configured to identify multiple paths from said sensor node to a sink of said wireless sensor network in response to detecting a temporal event, each path of said multiple paths comprising sensor node to sensor node hops; and
each sensor node of said set of sensor nodes configured to optimize a distribution of data packets to each path of said multiple paths by simultaneously reducing (i) power consumed by sensor nodes in each path of said multiple paths and (ii) a time to transmit said data packets from said sensor node to said sink using an optimization algorithm that optimizes the balance between power consumption of each path of said multiple paths and transmission delay through each path of said multiple paths.

20. The wireless sensor network of claim 19, each sensor node of said set of sensor nodes further including:
a processor for determining if an amount of data to be transmitted from said source sensor node to said sink exceeds a predetermined limit and if said amount of data is at or below said predetermined limit means for determining a single path from said source sensor node to said sink; and
a transceiver for transmitting data packets containing said data over said single path from said source sensor node to said sink.

21. The wireless sensor network of claim 19, each sensor node of said set of sensor nodes further including:
a multipath routing algorithm for finding multiple paths from said sensor node to said sink; and
an optimization algorithm for optimizing said distribution of data packets stored as code executable in each memory of each sensor node of said set of sensor nodes, said optimization algorithm describing an optimization equation and constraints on said optimization equation.

22. The wireless sensor network of claim 21, each sensor node of said set of sensor nodes further including:
a processor for performing a Lagrangian function to relax said optimization equation using said constraints and for solving said Lagrangian function for data packet distribution for each path of said multiple paths using sequential quadratic programming.

23. The wireless sensor network of claim 19, wherein each sensor node of said set of sensor nodes includes a processor for determining:
power consumption for each sensor node in each path of said multiple paths;
power consumed for transmission and reception of data packets over each path of said multiple paths;
a time delay for each hop of each path of said multiple paths;
a maximum allowable amount of time for transmission of data packets from said source sensor node to said sink;
a lifespan for each path of said multiple paths based on an amount of power a sensor node with a least amount of power remaining; and
a most stable path based on said lifespans of each path of said multiple paths.

24. The wireless sensor network of claim 19, further including:
a base station wirelessly connected to one or more of said set of sensor nodes; or
a gateway node wirelessly connected to one or more of said set of sensor nodes, said gateway node wire connected to said base station; and
wherein said base station is a general purpose computer and said gateway node has greater power reserves, greater transmit range or both greater power reserves and greater transmit range than each sensor node of said set of sensor nodes.

25. The wireless sensor network of claim 19, each sensor node of said set of sensor nodes further including:
a transceiver for transmitting the entire set of data packets from said source sensor node to said sink along a single path when an amount data to be transmitted is at or below a predetermined limit.

26. The wireless sensor network of claim 19, wherein each sensor node of said set of sensor nodes includes a processor for determining one or more of:
(i) power consumed for transmission and reception of data packets over each path of said multiple paths, (ii) a lifespan for each path of said multiple paths based on an amount of power of a sensor node of each path having a least amount of power remaining and (iii) a most stable path based on said lifespans of each path of said multiple paths.

* * * * *